(12) United States Patent
Gillard

(10) Patent No.: US 8,673,195 B2
(45) Date of Patent: Mar. 18, 2014

(54) METHOD FOR MAKING A REINFORCED STRUCTURAL PART FOR AN AUTOMOTIVE VEHICLE

(75) Inventor: Laurent Gillard, Southfield, MI (US)

(73) Assignee: Faurecia Bloc Avant, Nanterre (FR)

( * ) Notice: Subject to any disclaimer, the term of this patent is extended or adjusted under 35 U.S.C. 154(b) by 0 days.

(21) Appl. No.: 13/303,625

(22) Filed: Nov. 23, 2011

(65) Prior Publication Data

US 2012/0219748 A1 Aug. 30, 2012

(30) Foreign Application Priority Data

Nov. 25, 2010 (FR) ...................................... 10 59734

(51) Int. Cl.
*B29C 45/14* (2006.01)

(52) U.S. Cl.
USPC ......... 264/250; 264/255; 264/279; 264/279.1

(58) Field of Classification Search
USPC ............................... 264/250, 255, 279, 279.1
See application file for complete search history.

(56) References Cited

U.S. PATENT DOCUMENTS

| | | | | |
|---|---|---|---|---|
| 5,070,742 | A * | 12/1991 | Sakane et al. .................... | 74/552 |
| 5,792,302 | A * | 8/1998 | Nakada et al. ................. | 156/293 |
| 6,156,257 | A * | 12/2000 | Tachi et al. ..................... | 264/510 |
| 6,183,681 | B1 * | 2/2001 | Sullivan et al. ................ | 264/245 |
| 6,235,227 | B1 * | 5/2001 | Koyama et al. ................ | 264/132 |
| 6,328,920 | B1 * | 12/2001 | Uchiyama et al. ............. | 264/255 |
| 6,383,423 | B1 * | 5/2002 | Kurokawa et al. ........... | 264/46.4 |
| 6,954,967 | B2 * | 10/2005 | Park et al. ........................ | 16/412 |
| 7,143,663 | B2 * | 12/2006 | Menaldo et al. ................ | 74/552 |
| 7,749,419 | B2 | 7/2010 | Kimura et al. | |
| 2002/0064635 | A1 * | 5/2002 | Takefuji et al. ............... | 428/195 |
| 2003/0172769 | A1 * | 9/2003 | Ito et al. ........................... | 74/552 |
| 2004/0022988 | A1 * | 2/2004 | Park et al. ........................ | 428/68 |
| 2004/0070113 | A1 | 4/2004 | Ilse et al. | |
| 2007/0131012 | A1 | 6/2007 | Eipper et al. | |
| 2008/0060468 | A1 * | 3/2008 | Paonessa et al. ................ | 74/552 |
| 2010/0173126 | A1 | 7/2010 | Malek et al. | |

FOREIGN PATENT DOCUMENTS

| | | |
|---|---|---|
| DE | 102005011077 A1 | 9/2006 |
| DE | 202008015391 U1 | 5/2010 |
| DE | 102008058225 A1 | 7/2010 |
| EP | 1595676 A1 | 11/2005 |

(Continued)

OTHER PUBLICATIONS

Steiner G., et al. "Gemeinsam Macht Stark" Plastverarbeiter, Huethig GMBH, Heidelberg, DE vol. 55, No. 3, Jan. 1, 2004, pp. 46 to 48.

*Primary Examiner* — Christina Johnson
*Assistant Examiner* — Saeed Huda
(74) *Attorney, Agent, or Firm* — Davidson, Davidson & Kappel, LLC

(57) ABSTRACT

A reinforced structural part and method are provided. The reinforced structural part includes a body made from a plastic material provided with a core made from a metallic material. The method includes the steps of positioning the metallic core in a first mold cavity, injecting a plastic material into the first mold cavity, the cavity being arranged so that the plastic material over-molds at least part of the inner surface of the core, positioning the over-molded metal core in a second mold cavity and injecting a plastic material into said second mold cavity, the cavity being arranged so that the plastic material over-molds the entire outer surface of the core.

7 Claims, 1 Drawing Sheet

(56) References Cited

FOREIGN PATENT DOCUMENTS

| | | |
|---|---|---|
| EP | 2275244 A1 | 1/2011 |
| FR | 2783746 A1 | 3/2000 |
| JP | 8-276463 | 10/1996 |
| JP | 2007-263182 | 10/2007 |
| JP | 2010-214590 | 9/2010 |
| WO | 01/98052 A1 | 12/2001 |
| WO | 2005/016624 A1 | 2/2005 |
| WO | 2005/072930 A1 | 8/2005 |
| WO | 2009/135997 A1 | 11/2009 |

* cited by examiner

METHOD FOR MAKING A REINFORCED STRUCTURAL PART FOR AN AUTOMOTIVE VEHICLE

Priority is hereby claimed to FR 10 59734 filed on Nov. 25, 2010, the entire disclosure of which is hereby incorporated by reference herein.

The present invention relates to a method for producing a reinforced structural part for an automotive vehicle, of the type comprising a body made from a plastic material provided with a core made from a metallic material, said method comprising the following steps: positioning the metallic core in a first mold cavity and injecting a plastic material into said first mold cavity, said cavity being arranged so that the plastic material over-molds at least part of the inner surface of the core.

BACKGROUND

One method for producing such a part is for example described in document EP-1 927 453 to produce a tailgate lining for an automotive vehicle. The method described in this document provides for over-molding a metallic core with a plastic material in order to produce the reinforced tailgate lining.

In this method, the metal core is kept at the center of a mold cavity by holding means and a plastic material is injected into the mold cavity so as to coat the metal core, which makes it possible to obtain a reinforced structural part having a satisfactory stiffness.

SUMMARY OF THE INVENTION

However, such a method does not make it possible to guarantee a satisfactory appearance of the structural part coming out of the mold cavity. In fact, under the effect of the heat from the plastic material injected into the mold cavity, the metal core may deform, for example by crimping, and part of that deformed core may come into contact with the wall of the cavity, thereby preventing the plastic material from coating that part. At the outlet of the cavity, one then obtains a part having areas in which the metal core is visible from outside the part, which is particularly bothersome if that area is located on the outer surface of the part that is intended to be visible upon opening the frame of the automotive vehicle. In fact, the part then does not have a sufficient perceived quality to be mounted on an automotive vehicle.

Furthermore, the metal is not coated with the plastic material in the holding areas of the metal core in the mold cavity.

An object of the present invention is to offset these drawbacks by proposing a method for making a reinforced structural part having a satisfactory perceived quality coming out of the mold cavity, the metal core being invisible from outside the part.

The present invention provides a method for producing a reinforced structural part of the aforementioned type, in which it also comprises the following steps: positioning the over-molded metal core in a second mold cavity and injecting a plastic material into said second mold cavity, said cavity being arranged so that the plastic material over-molds the entire outer surface of the core.

Over-molding the metal core in two steps of injecting a plastic material makes it possible to avoid the presence of means for holding the metal core in the mold. In fact, one surface of the core is first covered by the plastic material, the other surface being able to rest against a wall of the first mold cavity, then the other surface is covered with a plastic material, while the first covered surface can rest against a wall of the second mold cavity. In this way, the core does not need to be held at the center of the mold cavity to be coated with plastic material.

The present invention may include one or more of the following features:
- part of the outer surface of the core is also over-molded by the plastic material during the injection of the plastic material into the first mold cavity;
- the over-molded part of the outer surface of the core, over-molded by injecting plastic material into the first mold cavity, is also over-molded by the plastic material during injection of the plastic material into the second mold cavity;
- a rim is over-molded on the outer surface of the core during the injection of plastic material into the first mold cavity, said rim being over-molded by the plastic material during the injection of plastic material into the second mold cavity;
- ribs are injected on the inner surface of the core during the injection of plastic material into the first mold cavity;
- the core is made in two parts of metal material, the inner surfaces of said two parts being simultaneously over-molded by plastic material during the injection of plastic material into the first mold cavity;
- a junction area is injected into the first mold cavity during the over-molding of the two parts forming the core, the junction area connecting said two parts to one another;
- a portion of non-reinforced structural part is molded in a single piece with the reinforced structural part during the injection of plastic material into the first and/or second mold cavities; and
- a tailgate lining for an automotive vehicle is formed by injecting plastic material into the first and second mold cavities.

The present invention also provides a reinforced structural part comprising a body made from a plastic material and a core made from a metal material, said part comprising an inner portion formed from a plastic material over-molding the inner surface of the core and an outer portion formed by a plastic material over-molding the outer surface of the core, said part being made according to the method described above.

BRIEF DESCRIPTION OF THE DRAWINGS

Other aspects and advantages of the invention will appear upon reading the following description, provided as an example and done in reference to the appended drawings, in which.

DETAILED DESCRIPTION

In the description, "inner" refers to elements facing the inside of the automobile and "outer" refers to elements facing the outside of the automobile.

Figure 3:
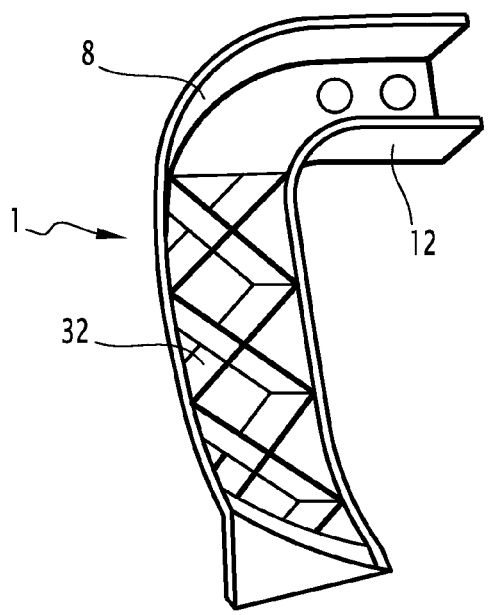
FIG. 3 is a diagrammatic perspective illustration of a portion of the structural part made with the method according to the invention.

The reinforced structural part 1, partially illustrated in FIG. 3, made with the method according to the invention comprises a core 2 made from a metallic material, comprising an inner surface 4 and an outer surface 6 and one or more plastic materials coating the core 2 so as to form an inner portion 8 formed by a plastic material 10 over-molding the inner surface 4 of the core 2 and an outer portion 12 formed by a plastic material 14 over-molding the outer surface 6 of the core 2. The plastic material 10 and the plastic material 14 form the body of the reinforced structural part 1.

The reinforced structural part described above for example forms a portion of a tailgate lining for an automotive vehicle. In particular, as shown in FIG. 3, the reinforced structural part 1 has a groove shape forming a frame intended to receive the rear window of an automotive vehicle. According to one particular embodiment, the reinforced structural part 1 can be made in a single piece with the rest of the tailgate lining, not reinforced.

Figure 1:
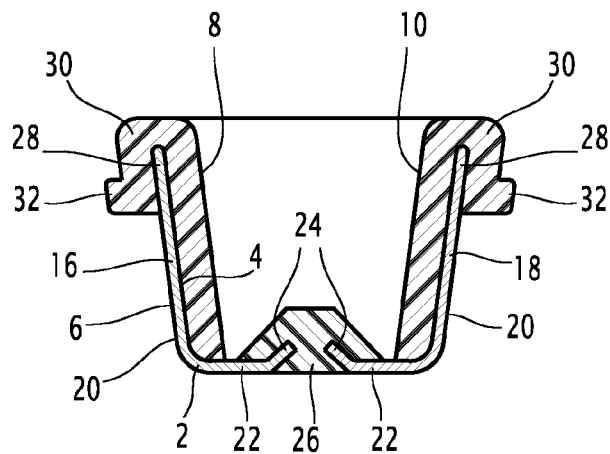
FIG. 1 is a diagrammatic cross-sectional illustration of a structural part at the outlet of the first mold cavity after the first step of injecting a plastic material.
Figure 2:
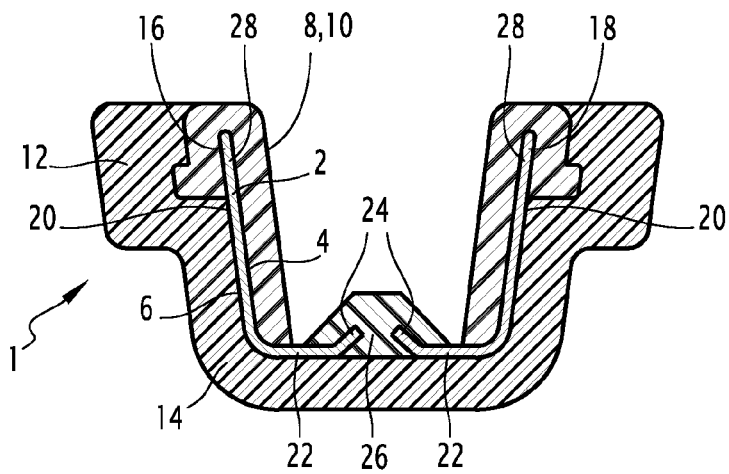
FIG. 2 is a diagrammatic cross-sectional illustration of a structural part at the outlet of the second mold cavity after the second step of injecting a plastic material.

As shown in FIG. 2, the reinforced structural part 1 has a U-shaped section to form the groove. The core 2 also has a U-shaped section if it is formed in a single piece, but according to the embodiment shown in FIGS. 1 and 2, the core 2 is formed by two parts 16 and 18, each having an L-shaped section. Thus, each part 16, 18 has a first branch 20 forming a branch of the U-shaped section and a second branch 22 forming a portion of the bottom of the groove.

We will now describe the method for making a reinforced structural part 1, from the core 2 described above.

During a first step, the core 2 is positioned on the bottom of a first mold cavity of an injection mold having a shape arranged to form the inner portion 8 of the reinforced structural part. The outer surface 6 of the core 2 is positioned against a wall of the mold cavity that has a shape substantially complementary to the outer surface 6 of the core 2, i.e. a groove shape, so that the inner surface 4 of the core 2 faces the first mold cavity. In this way, when a plastic material 10 is injected into the first mold cavity, this material 10 covers the inner surface 4 of the core 2.

When the core 2 is made in two parts 16, 18, the second branch 22 of each of the parts is positioned against the bottom of the first mold cavity and is spaced apart from the second branch 22 of the other part forming the core 2, so that part of the bottom of the first mold cavity is not covered by the core 2. Furthermore, according to the embodiment shown in the figures, the end of the second branch 22 of the parts 16 and 18 forms an angle 24 relative to the rest of the second branch 22 so that a space exists between the bottom of the first cavity and the end of the second branch 22.

The first mold cavity is sealably closed so as to form the inner portion 8 of the structural part 1 when the plastic material 10 is injected into the first mold cavity. The plastic material 10 covers the inner surface 4 of the core 2 and attaches the two parts 16 and 18 while forming a junction area 26 coating the angles 24 of the two branches 22 of said parts 16 and 18 and filling the space separating said second branches 22. The presence of the angles 24 allows the plastic material to coat the two surfaces, inner 4 and outer 6, of the angles 24 by filling the space separating said angles 24 from the bottom of the first mold cavity. One thus ensures a robust connection between the two parts 16 and 18 forming the core 2.

The first mold cavity is also arranged so that an upper portion 28 of the first branches 20 of the parts 16 and 18, opposite the second branches 22, is coated on their inner surface 4 side and their outer surface 6 side, as shown in FIG. 1, so as to form a rim 30 extending from the outer surface 6 side of the core 2. Thus, in the upper portion 28 of the first branches 22, the plastic material 10 coats the inner surface 4, passes above the upper end of the first branches 20 and coats the outer surface 6 so as to form the rim 30. This rim 30 has a shoulder 32 extending toward the outside of the inner portion 8.

During the step of molding the inner portion 8 of the reinforced structural part 1, other elements can be molded in this inner portion 8 by adapting the mold to that end. Thus, ribs 34 are for example molded in the inner portion 8, as shown in FIG. 3.

Alternatively, the entire inner surface 4 of the core 2 is not over-molded by the plastic material 10 injected into the first mold cavity and certain areas of the inner surface 4 of the core 2 are left visible.

Once the inner portion 8 is made, that portion 8 is placed in a second mold cavity, the shape of which is adapted to receive the inner portion 8 so that the plastic material 10 of the inner portion 8 is pressed against a wall of the mold cavity, with a shape complementary to the inner portion 8, and the outer surface 6 of the core 2 faces the second mold cavity. Thus, when a plastic material 14 is injected into the second mold cavity, that material 14 covers the outer surface 6 of the core 2.

The inner portion 8 can be transported from the first mold cavity to the second mold cavity by a tool able to grasp the inner portion 8 by the rim 30 so as not to damage the metal core 2. According to another embodiment, the mold cavities are formed by closing two mold portions, one of the mold portions being shared by both mold cavities, the passage from one mold cavity to the other occurring simply by replacing one mold portion, adapted to form the first mold cavity with the shared mold portion, with another mold portion adapted to form the second mold cavity with the shared mold portion.

The second mold cavity is sealably closed so as to form the outer portion 12 of the structural part 1 when the plastic material 14 is injected into the second mold cavity. The injected plastic material 14 covers the outer surface 6 of the core 2 as well as the junction area 26 and the rim 30 with plastic material 10 coming from injecting plastic material 10 into the first mold cavity. The over-molding of the junction area 26 and the rim 30 with the plastic material 14 injected into the second mold cavity makes it possible to ensure robust cohesion between the plastic material 10 forming the inner portion 8 and the plastic material 14 forming the outer portion 12.

At the outlet of the second mold cavity, the reinforced structural part 1 is obtained whereof the entire outer surface, intended to be visible, is made from a plastic material 14 without risk of the metal material of the core 2 appearing in that outer surface.

In fact, since the inner surface 4 of the core 2 has been previously over-molded by injecting a plastic material 10 into the first mold cavity, the core 2 is firmly maintained by that plastic material 10 forming the inner portion 8 of the part and does not deform during the injection of plastic material 14 into the second mold cavity.

Furthermore, the method described above does not require means for holding the core 2 in the first and second mold cavities because the core 2 or the plastic material 10 over-molding the inner surface 4 of the core 2 are pressed directly against a wall of the first or second mold cavity. This absence of holding means makes it possible to simplify the method of making the reinforced structural part 1 and protect the metal material of the core 2. Furthermore, the absence of these holding means makes it possible to guarantee complete over-molding of the core 2.

What is claimed is:

1. A method for producing a reinforced structural part for an automotive vehicle, comprising a body made from a plastic material provided with a core made from a metallic material, the core including an inner surface and an outer surface opposite the inner surface of the core, the method comprising the following steps:

positioning the metallic core in a first mold cavity;

injecting a first plastic material into the first mold cavity, the cavity being arranged so that the first plastic material over-molds at least part of the inner surface of the core and part of the outer surface of the core;

positioning the over-molded metal core in a second mold cavity; and injecting a second plastic material into the second mold cavity, the cavity being arranged so that the second plastic material over-molds the entire outer surface of the core so the second plastic material directly contacts the first plastic material and a part of the outer surface of the core that is not over-molded by the first plastic material.

2. The production method according to claim 1, wherein the over-molded part of the outer surface of the core, over-molded by injecting first plastic material into the first mold cavity, is also over-molded by the second plastic material during injection of the second plastic material into the second mold cavity.

3. The production method according to claim 1, further comprising a rim that is over-molded on the outer surface of the core during the injection of first plastic material into the first mold cavity, the rim being over-molded by the second plastic material during the injection of plastic material into the second mold cavity.

4. The production method according to claim 1, further comprising ribs that are injected on the inner surface of the core during the injection of first plastic material into the first mold cavity.

5. The production method according to claim 1, wherein the core is made in two parts of metal material, the inner surfaces of the two parts being simultaneously over-molded by first plastic material during the injection of first plastic material into the first mold cavity.

6. The production method according to claim 5, further comprising a junction area, the junction area being formed from the first plastic material while in the first mold cavity during the over-molding of the two parts forming the core, the junction area connecting the two parts to one another.

7. The production method according to claim 1, wherein a portion of non-reinforced structural part is molded in a single piece with the reinforced structural part during the injection of first or second plastic material into the first or second mold cavities, respectively.

* * * * *